UNITED STATES PATENT OFFICE.

HENRY D. NILES AND IRA A. THAYER, OF BAZETTA, OHIO.

IMPROVEMENT IN COMPOUNDS FOR DESTROYING INSECTS.

Specification forming part of Letters Patent No. 149,601, dated April 14, 1874; application filed March 23, 1874.

*To all whom it may concern:*

Be it known that we, HENRY D. NILES and IRA A. THAYER, of Bazetta, county of Trumbull and State of Ohio, have invented a new compound for the prevention of the ravages of insects and vermin upon fruit, forest, and ornamental trees, shrubs, and vines; and we do hereby declare that the following is a full and exact description thereof.

The nature of our invention consists in mixing together the different ingredients in about the following proportions: First, unslaked lime, two ounces; second, sulphur, four drams; third, caustic soda, two drams; fourth, tobacco, two drams; fifth, Paris green, two drams; sixth, American hellebore, two drams; seventh, water, one-half pint. Mix the lime, sulphur, caustic soda, and Paris green together; then infuse the tobacco and American hellebore in one-half pint of water, strain off the infusion, adding it to the powder; stir till thoroughly slaked and mixed, the whole, when mixed, forming a compound which will effectually prevent the ravages of insects and vermin upon fruit, forest, and ornamental trees, shrubs, and vines.

We first remove the ross from the tree with a knife, or other convenient means, taking special care to probe all holes or hiding-places of insects or larvæ, then apply the compound with a brush to the surface of the tree, shrub, or vine.

What we claim as new and our invention, and desire to have secured to us by Letters Patent of the United States, is—

The aforesaid compound formed of the above-named ingredients, in about the proportions and for the purpose herein set forth and described.

HENRY D. NILES.
                IRA A. THAYER.

Witnesses:
   HENRY G. STRATTEN,
   L. H. THAYER.